June 13, 1967  G. N. LUKAS  3,325,162
ADJUSTABLE BLOCK
Filed Nov. 6, 1964
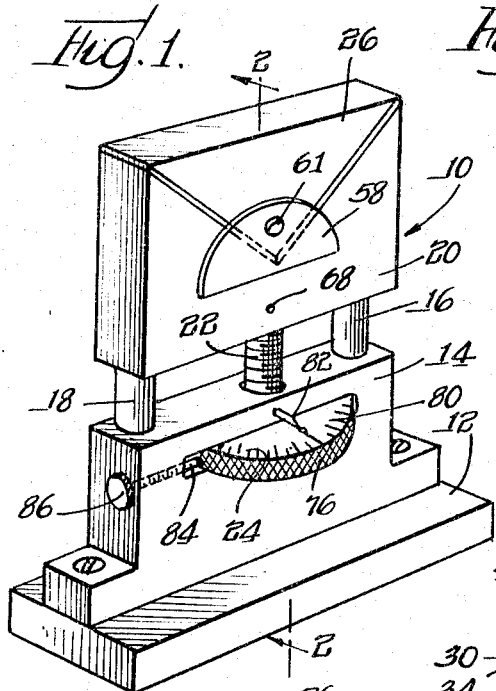
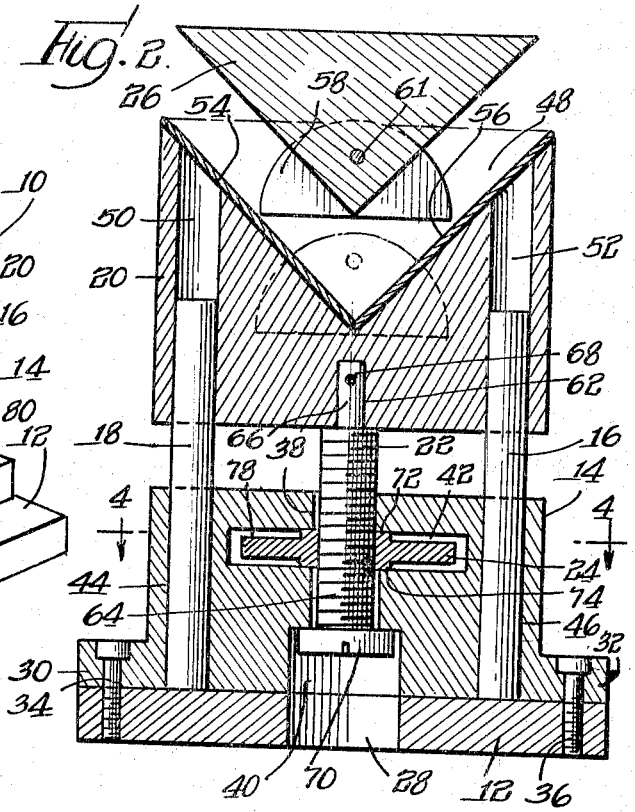
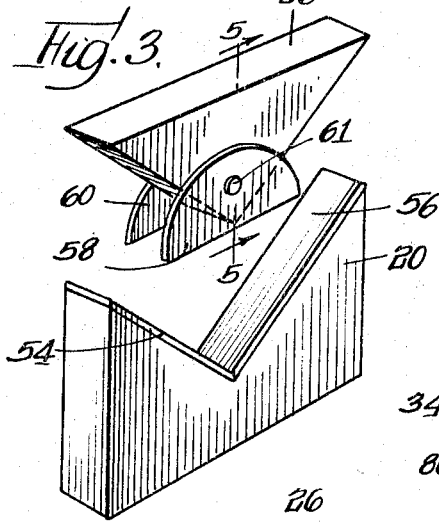
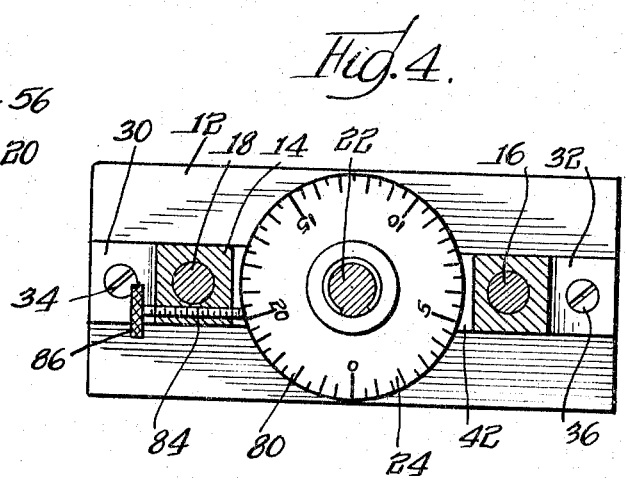
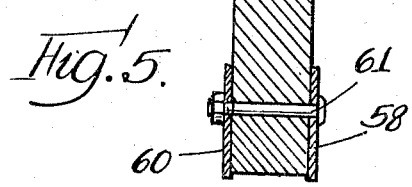
Inventor
George N. Lukas
By Stone, Nierman, Burmeister & Zimmer
Attys.

United States Patent Office 3,325,162
Patented June 13, 1967

3,325,162
ADJUSTABLE BLOCK
George N. Lukas, 4637 N. Clark St.,
Chicago, Ill. 60640
Filed Nov. 6, 1964, Ser. No. 409,433
10 Claims. (Cl. 269—60)

This invention relates to an improved machine shop device and more particularly an improved adjustable block.

Ordinarily in machine shop practice, it is necessary in certain operations to hold a workpiece in a particular attitude while the workpiece is being cut or finished in some particular manner. Customarily the workpiece is held up by a flat block or a V-block. In order to have a block at a prescribed height, additional blocks or shims are generally used to raise the workpiece. To eliminate the problem of raising and lowering a block in minute increments, by inserting or removing shims, adjustable V-blocks are available. One of the problems with the available adjustable V blocks is that they are quite expensive. It is one of the principal objects of the present invention to provide an adjustable V-block in which the construction is such that it may be economically manufactured.

It is another object of the present invention to provide an adjustable V-block which V-block has an indicating device built into the V-block construction so that the amount of movement of the movable portion of the V-block may be easily and accurately observed.

It is a further object of the herein disclosed invention to provide an adjustable V-block construction in which the movable portion of the V-block may be securely positioned in a select attitude and the portion will not change its position due to vibration or ordinary handling thereby providing the advantages of a fixed block as well as an adjustable block.

It is a still further object of the herein disclosed invention to provide an adjustable block construction which may be used alternatively as a V-block or as a block having a flat face.

Other objects and uses of the present invention will become readily apparent to those skilled in the art upon a perusal of the following specification in light of the accompanying drawing in which:

FIGURE 1 is a perspective view of an adjustable block embodying the herein disclosed invention;

FIGURE 2 is a partial cross sectional view of the block showing FIGURE 1 with an insert which constitutes a portion of the block shown in an exploded attitude in order to show better the construction of the block;

FIG. 3 is a perspective exploded view of head and insert construction of the block shown in FIGURE 1;

FIGURE 4 is a cross sectional view taken on line 4—4 of FIGURE 2; and

FIGURE 5 is a cross sectional view of the insert shown in FIGURE 3 taken on the line 5—5 of FIGURE 3.

Referring now to the drawing and especially to FIGURE 1, an adjustable block embodying the present invention and generally indicated by number 10 is shown therein. The block 10 generally includes a base 12 with a body 14 mounted on the base. The body has a pair of guide rods 16 and 18 mounted therein and a head 20 is slidably mounted on the guide rods 16 and 18. A screw jack 22 is secured to the head for moving the head, a wheel 24 is threadedly connected to the screw jack and an insert 26 is removably mounted in the head.

As may be seen in FIGURES 1 and 2, the base 12 is a generally flat member having a rectangular outline with a head aperture 28 in the central portion thereof. The body 14 includes a pair of integral ears 30 and 32 which receive screws 34 and 36, respectively, to secure the body to the base. The body has an axial screw aperture 38 with a stop head aperture 40 concentric with the axial screw aperture. The stop head aperture 40 is in registry with the head aperture 28 of the body. Extending through the body in a direction perpendicular to the axis of the axial screw aperture 38 is a wheel slot 42. Positioned on opposite sides of the axial screw aperture 38 are guide openings 44 and 46. The guide rods 18 and 16 are press fitted into the guide openings 44 and 46, respectively.

The head 20 has a V-notch 48 on one side thereof opposed to the side adjacent to body 14. Extending through the head is a pair of guide rod openings 50 and 52 which open into the V-notch 48. The guide rods 18 and 16 are slidably mounted in the guide rod openings 50 and 52, respectively.

In order to provide a hard surface for the working face of the head, the head has a spring steel face 54 adhesively secured to one face of the V-notch covering the openings 50, and a second spring steel face 56 on the other side of the notch surface covering the opening 52. It may be appreciated that inasmuch as the faces 54 and 56 are made of spring steel they provide a tough, durable and wear-resistant face for the head.

The insert 26 is formed to mate with the notch 28 so that the head 20 may provide a flat surface rather than a notch for engagement with a workpiece. In order to hold the insert 26 in position, a retainer is provided. The retainer includes a pair of semi-circular plates 58 and 60 mounted on the insert by a bolt 61. It is evident that when the insert is in position, the plates 58 and 60 engage the head 20 to prevent the insert from moving laterally relative to the head. The longitudinal movement of the head is prevented by the V-notch so that the insert is securely held in place.

The head includes a screw aperture 62 which has its axis intersecting the apex of the V-notch, which aperture 62 receives the jack screw 22. The jack screw 22 includes a conventional threaded portion 64 and has an extension 66 on one end which mates with aperture 62. A pin 68 extends through the head and through the extension 66 to secure the jack screw to the head. At the opposite end of the jack screw, there is a stop head 70 which moves freely in apertures 28 and 40 and is engageable with the body at the end of a stroke of the jack screw.

In order to provide a means for moving the jack screw, the wheel 24 is provided. The wheel 24 has an internal thread in its center which mates with the threaded portion of the jack screw. The wheel is positioned in slot 42 of the body and has an upper boss 72 engageable with the upper surface of the slot and a lower boss 74 which is engageable with the lower surface of the slot. The wheel has an outer periphery 76 which is knurled. Between the boss 72 and the outer periphery of the wheel, there is a flat surface 78 which has a dial 80 fixed thereon. The dial is calibrated between "0" and "25" representing one quarter of an inch. It is obvious that the calibration of the dial is determined by the pitch of the jack screw so that the amount of movement of the head for each revolution of the wheel is entirely dependent upon the pitch of the jack screw. A pointer 82 is fixed to the body and is cooperative with the dial for indicating the movement of the head relative to the body.

In order to prevent the wheel 24 from rotating due to vibration or handling, a lock screw 84 is threadedly mounted in the body. The lock screw 84 engages the knurled periphery 76 of the wheel at one end. There is an enlarged head 86 at the other end of the lock screw for convenient manipulation of the lock screw.

It may be appreciated that the instant adjustable block 10 may be quickly and economically fabricated. The manufacture of the base 12 may be simply done by cutting the base to size and drilling a hole for the aperture 28. The body 14 is simply manufactured, and the forming operations are limited to a few drilling and reaming operations and a milling operation for the slot. The head is easily manufactured and there is a particular advantage in being able to drill and ream the guide openings 50 and 52 through the length of the block. Covering the openings with the spring steel facing 54 and 56 simplifies the manufacture of the head. In as much as the load on the spring steel facing is primarily a compression load, it is obvious that the facing may be secured to the head by an epoxy resin or other such bonding agent thereby eliminating the need for screws and also provides the advantage of a smooth face.

The assembly of the instant V-block is a simple operation. After the base is manufactured, the base is attached to the body by means of screws 34 and 36. The guide rods 16 and 18 are press fitted into their respective openings and are bottomed on the base. The head with the faces in the notch is slidably mounted on the guide rods. The wheel 24 is positioned in slot 42 and the jack screw 22 has its threaded portion 64 placed into mating engagement with the wheel. The jack screw is extended through the axial screw aperture 38 and has its extension 66 positioned in aperture 62. The pin 68 is then press fitted into the head to secure the jack screw to the head. The lock screw is then mounted in the body and into engagement with the wheel.

In the operation of the instant block, the insert 26 is used when it is advisable to have a block having a flat face; however, when a V-notch is required, the insert is simply removed. In order to adjust the head with or without the insert included, the lock screw 86 is loosened and the wheel is turned to raise or lower the head relative to the body. When the appropriate spacing of the head to the body is achieved, the lock screw is then tightened to prevent the wheel from being accidentally turned or allowing the vibration of a machine to cause the wheel to turn. It should be noted that in as much as the axis of the jack screw is aligned with the apex of the notch, the load is always directly on the jack screw and the guide rods simply provide a means to prevent rotation of the head relative to the body. It may be appreciated that the load is transmitted from the jack screw to the boss 74 of the wheel so that the boss is in tight engagement with the body. In as much as the load holds the boss and body in metal to metal contact, the indication on the dial 80 is quite accurate so that an adjustment of the subject block may be accurately indicated on the dial. The operation of the dial simplifies the measuring operation in actual usage since it is not necessary for a machinist to use calipers or other such similar devices to achieve accurate positioning of the workpiece.

Although a specific embodiment of the herein disclosed invention has been shown and described herein, it is readily apparent that those skilled in the art may make various changes and modifications in the invention without departing from the scope and spirit of the invention. It is to be clearly understood that the instant invention is limited only by the appended claims.

What is claimed is:

1. An adjustable V-block comprising, in combination, a body having an axial aperture contained therein, a slot extending through the body and intersecting the aperture, a screw movably mounted in said aperture, a wheel positioned in the slot and threadedly engaging the screw to move the screw selectively relative to the body, a notched head having a V-notch fixedly connected to the screw for movement with the screw relative to the body, and a guide rod connected to the body and the head to prevent rotation of the head relative to the body, whereby the head is spaced relative to the body by rotation of the wheel to move the screw relative to the body.

2. An adjustable block comprising, in combination, a body having an aperture contained therein with a slot extending through the body and intersecting the aperture, a wheel rotatedly mounted in the slot, a screw threadedly engageable with the wheel and axially movable in said aperture, a dial on said wheel, a pointer mounted on said body and cooperative with said dial, a head having a V-notch on one side and the opposite side connected to said screw for movement with said screw relative to the body, and means to prevent rotation of the head relative to the body, whereby rotation of the wheel relative to the body causes the head to be displaced relative to the body and the displacement is indicated by the cooperation of the pointer with the dial.

3. An adjustable block comprising, in combination, a body having an axial aperture contained therein with a slot extending through the body and intersecting the aperture, said body having a guide opening parallel to the aperture, a guide rod mounted in said guide opening, a base secured to the body for closing one end of said guide opening a head having a V-notch on one side slidably receiving said guide rod, a screw movably mounted in the aperture of the body and being connected to the head on the side opposite to the side having the V-notch, and a wheel rotatably mounted in the slot and threadedly engaging the screw for axial movement of the head relative to the body.

4. An adjustable block comprising, in combination, a body having an axial aperture and a slot extending therethrough and intersecting the aperture, a wheel rotatably mounted in the slot, a screw movably mounted in the aperture and threadedly engaging the wheel, a head having a V-notch connected to the screw with the V-notch on the side spaced away from the body, means to prevent rotation of the head relative to the body, and a removable insert positioned in the notch of the head, whereby rotation of the wheel displaces the head relative to the body and the head may be selectively positioned relative to the body.

5. An adjustable block comprising, in combination, a body having an axial aperture and a slot extending through the body and intersecting said aperture, a pair of guide openings on opposite sides of the aperture being substantially parallel to said aperture, a guide rod being fitted into each of the guide openings, a head slidably mounted on each of the guide rods, a screw having one end connected to the head and being axially movable in the aperture of the body, a wheel rotatably mounted in the slot and engageable with the screw to control the movement of head and body, a dial on said wheel, and a pointer connected to the body and cooperative with the dial to indicate the displacement of the head relative to the body.

6. An adjustable block comprising, in combination, a body having an axial aperture and a slot extending through the body communicating with the aperture, said body having a pair of guide openings on opposite sides of the aperture and being parallel to the aperture, a wheel rotatably mounted in the slot, a screw axially movable in the aperture and in threaded engagement with the wheel, a head connected to the screw for movement with the screw relative to the body, said head having a pair of axial guide openings slidably receiving the guide rods, said head having a V-notch in its side opposite the body, a spring steel face being secured to each side of the V-notch, and a screw threadedly mounted in the body for engagement with the wheel for selectively locking the wheel at a predetermined position.

7. An adjustable block comprising, in combination, a head having a V-notch on one side thereof, said head having a pair of parallel elongated guide openings, each of said openings intersecting the surface forming a portion of the V-notch, a spring steel facing mounted on each surface of the head forming a portion of the V-notch covering the guide openings and providing wear surface for the head, a guide rod slidably mounted in each of the guide openings, a screw having one end connected to the head and extending away from the side of the head having the notch, said screw having its axis intersecting the apex of the V-notch, a body having an axial aperture contained therein movably receiving the screw, said body having a pair of guide openings parallel to the aperture and press fittedly receiving one of the guide rods in each of the openings, said screw having a head on the end for the head for engagement with the body to regulate the displacement of the head relative to the body, said body having a slot contained therein and intersecting the aperture, a wheel rotatably mounted in the slot and threadedly engaging the screw to control the displacement of the head relative to the body, a dial on said wheel, a pointer connected to the body and cooperative with the dial to indicate the displacement of the head relative to the body, and a locking means engageable with the wheel to hold selectively the wheel for holding the position of the head relative to the body.

8. An adjustable block comprising, in combination, a body having an axial aperture and a slot extending through said body and intersecting the aperture, said body having a pair of parallel elongated guide openings on opposite sides of the aperture and being parallel to the aperture, a guide rod press fitted into each of the guide openings, a base secured to the body for closing one end of each of the guide openings, a head slidably receiving the guide rods, a screw movably mounted in the aperture and having one end connected to the head, a wheel rotatably mounted in the slot and threadedly engageable with the screw for control of the displacement of the head relative to the body, a dial on said wheel and a pointer mounted on the body and cooperative with said dial to indicate the displacement of the head relative to the body.

9. An adjustable block comprising, in combination, a body having an aperture contained therein with a slot extending through the body and intersecting the aperture, a wheel rotatably mounted in the slot, a screw axially movable in said aperture and in threaded engagement with the wheel for movement relative to the body by rotation of the wheel, a head having a V-notch on one side spaced from the body and having the other side opposite the V-notch connected to the screw, means to prevent rotation of the head relative to the body, a removable insert positioned in the notch of the head to provide a substantially flat surface for the head, a dial mounted on the wheel, a pointer connected to the body and cooperative with the dial to indicate the displacement of the head relative to the body, and a lock screw threadedly mounted on the body and engageable with the wheel to hold selectively the wheel to the body.

10. An adjustable block comprising, in combination, a substantially flat body having a pair of outwardly extending ears, said body having a circular aperture therethrough and a substantially flat slot extending through the body and intersecting the aperture, the said body having a pair of guide openings on opposite sides of the aperture extending through the body and being parallel to the circular aperture, a base secured to the body and closing one end of each of the guide openings, said body and said base each having an enlarged aperture in registry and said apertures being concentric with the circular aperture of the body, a guide rod press fitted into each of the guide openings of the body, a head having a pair of openings slidably receiving the guide rods, said head having a V-notch on the side opposite to side adjacent to the body and said head guide openings extending to the V-notch, a spring steel face adhesively secured to each of the faces of the V-notch and closing the head guide openings, an insert positioned in the V-notch to provide a substantially flat face for the head, a retainer mounted on the insert for engagement with the head to hold the insert relative to the head, a screw having one end connected to the head on the side adjacent to the body, said screw being axially movable in the circular aperture of the body and having a stop head at its opposing edge movable in the enlarged apertures of the base and body and engageable with the body to regulate the displacement of the head relative to the body, a wheel having a boss on either side rotatably mounted in the slot and in threaded engagement with the screw to displace selectively the head relative to the body, a dial mounted on one face of the wheel, a pointer mounted on the body and cooperative with the dial to indicate the displacement of the head relative to the body, and a lock screw threadedly mounted in the body and engageable with the wheel to lock the head at a selected position.

References Cited

UNITED STATES PATENTS

| | | | |
|---|---|---|---|
| 1,009,090 | 11/1911 | Parker | 269—243 |
| 2,389,243 | 11/1945 | Tillett | 77—62 |
| 2,416,782 | 3/1947 | Valish | 269—60 X |
| 3,218,059 | 11/1965 | Andrew | 77—62 |

FOREIGN PATENTS 117,919   7/1917   Great Britain.

W. D. BRAY, *Assistant Examiner.*

WILLIAM W. DYER, JR., *Primary Examiner.*